United States Patent [19]

Condolios

[11] 3,915,858

[45] Oct. 28, 1975

[54] DEVICE FOR THE SEPARATION OF TWO LIQUIDS

[75] Inventor: Elie Condolios, Grenoble, France

[73] Assignees: Societe Generale de Constructions Electriques et Mecaniques Alsthom, Paris, France; N.V. Technische Maatschappij Bergmann, Berkel en Rodenrijs, Netherlands

[22] Filed: Nov. 4, 1974

[21] Appl. No.: 520,796

[30] Foreign Application Priority Data

Nov. 14, 1973 France .............................. 73.40439

[52] U.S. Cl. .................. 210/85; 210/520; 210/521; 210/540
[51] Int. Cl.² ........................................ B01D 21/24
[58] Field of Search ........... 210/519, 520, 521, 522, 210/523, 540, 95

[56] References Cited
UNITED STATES PATENTS

| | | | |
|---|---|---|---|
| 1,940,794 | 12/1933 | Fisher | 210/522 |
| 3,510,006 | 5/1970 | Chersson | 210/522 |
| 3,706,384 | 12/1972 | Weldman-Hane | 210/522 X |
| 3,849,310 | 11/1974 | Condolios et al. | 210/520 X |
| 3,849,311 | 11/1974 | Jakubek | 210/540 X |

*Primary Examiner*—John Adee
*Attorney, Agent, or Firm*—Edmund M. Jaskiewicz

[57] ABSTRACT

Device for the separation of two non-miscible liquids comprising, from top to bottom, an upper storage chamber (11), a cylindro conical part (9) diverging downwards, a second conical part (8) diverging downwards separated from the first by a grating (10) and comprising inside it several concentric cones (7) parallel to its wall (8), a third central cylindrical part (4) a fourth conical part (17) converging downwards, comprising, inside it, several concentric cones (16) parallel to its wall, a fifth conico-cylindrical part (18) converging downwards, separated from the fourth by a grating (19) and lastly, a lower storage chamber (20) a mixed liquid supply pipe (1) placed in the axis of the third part (4) and opening out vertically downwards into a deflector element (3), an output (14) for the light liquid in the top of the upper storage chamber (11) and an output (23) for the heavy liquid in the bottom of the lower storage chamber (20).

6 Claims, 2 Drawing Figures

DEVICE FOR THE SEPARATION OF TWO LIQUIDS

The present invention has for its object a device for the separation of a mixture of two non-miscible liquids having a different density and viscosity, one of the ingredients of that mixture being in the form of a liquid in a continuous state, the other being in the form of droplets within the first, the liquid whose proportion is the greatest being in a continuous state, the other being in the form of droplets.

The separation device according to the invention is characterized in that it comprises, from top to bottom, seven superimposed parts constituted by an upper storage chamber, a cylindro-conical part diverging downwards, a second conical part diverging downwards, separated from the first by a grating and comprising, inside it, several concentric cones parallel to its wall, a third central cylindrical part, a fourth conical part converging downwards, comprising, inside it, several concentric cones parallel to its wall, a fifth conico-cylindrical part converging downwards, separated from the fourth by a grating and lastly, a lower storage chamber, a mixed liquid supply pipe placed in the axis of the third part and opening out vertically downwards into a deflector element, an output for the light liquid in the top of the upper storage chamber and an output for the heavy liquid in the bottom of the lower storage chamber.

That deflector element may comprise a free central space and a peripheral portion provided with fins imparting to the flow a centrifugal swirling movement.

That element may be mounted so as to rotate freely or be driven by a motor.

The deflector element may be constituted by a horizontal plate fixed in the central zone of the third part.

The device according to the invention operates in three distinct successive separation phases, namely, a pre-separation of the droplets from the liquid, with an enlarging of the drops by the slowing down of the liquid flow in the third cylindrical part in which the mixture is inserted, followed by a main separation with agglomeration of the drops by coalescence on the walls of the conical annular chambers of the second and fourth conical parts and a continuous flow of liquid along these walls and lastly, in the first and fifth cylindro-conical parts, a final separation of the drops from the liquid by decanting with a return into the third part of the drops and of the liquid which have not been separated for recycling, the purified light liquid being collected in the upper storage chamber and removed, the purified heavy liquid being collected in the lower storage chamber and removed.

The characteristics and advantages of the device will become apparent, moreover, from the following description of an embodiment chosen by way of an example with reference to the accompanying drawings, in which.

Figure 1:
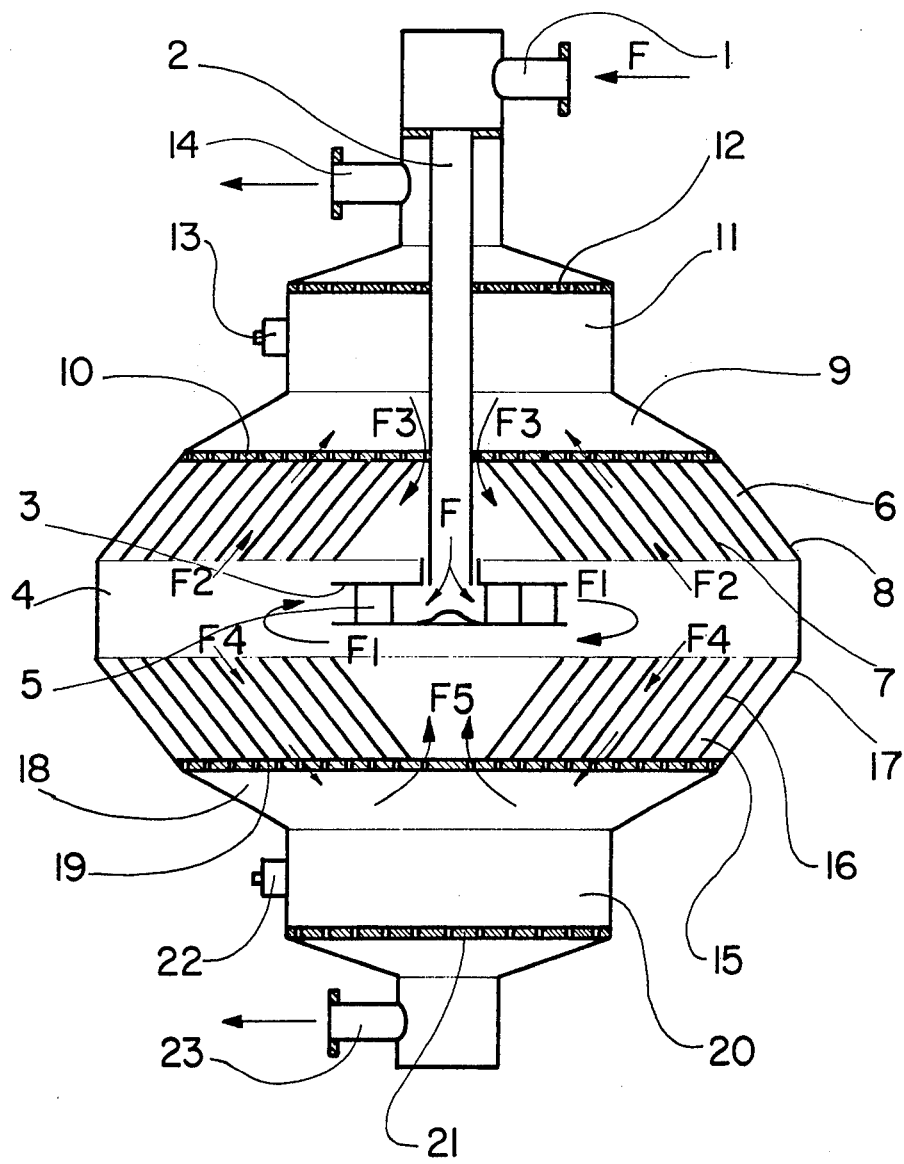
FIG. 1 is an axial vertical cutaway view of a device according to the invention.

With reference to FIG. 1, the mixture of two non-miscible liquids to be separated is inserted in the device by an inlet tubing 1 in the direction of the arrow F and brought by a pipe 2 into a deflecting element 3 situated in the cylindrical part 4, that element comprising blades 5 formed and arranged judiciously to set up a slow central swirling movement in the direction of the arrows F1 which is propagated in the part 4 as a whole.

That non-miscible mixture is formed by droplets of a liquid within another liquid having different density and viscosity, the liquid having the smallest proportions in that mixture constituting the droplets. In the present example, a non-miscible mixture is constituted by a proportion of 60% of a heavy liquid (continuous liquid state) and 40% of another lighter liquid (in the form of droplets).

The slow swirling movement set up in the part 4 makes it possible to lengthen the trajectory of the fine droplets of liquid to bring them towards the periphery, enlarging them and at the same time effects a pre-separation of the heavy liquid, which goes towards the base, from the droplets of light liquid which go upwards.

The greater part of the droplets of light liquid move upwards in the direction of the arrows F2, drawing away a certain quantity of heavy liquid into the inclined annular chambers 6 formed by the concentric conical walls 7 of the conical part 8 of the device which constitutes the main separation part.

Due to the fact that in these annular chambers, the greater part of the mixture inserted is formed by droplets of light liquid, there occurs a transformation of the droplets of light liquid into continuous liquid state, with transformation into droplets of the heavy liquid drawn away.

These latter fall on the inclined bottom of the chambers to become enlarged by coalescence on coming into contact with that bottom and forming a continuous layer of heavy liquid which then moves downwards along the bottom to return into the cylindrical part 4 to be treated in the lower part of the device.

The light liquid with still a few droplets of heavy liquid emerges from the upper part of the chambers 6 to enter the cylindroconical part 9 which constitutes the final separation chamber, through a grating 10 for checking and distributing the discharge.

In that chamber 9, the droplets of heavy liquid have a tendency to keep to the bottom and, by a secondary flow set up by the central swirling movement, are drawn away with a small quantity of light liquid in the direction of the arrows F3, towards the cylindrical part 4, where that mixture is recycled.

The purified light liquid moves upwards in a storage chamber 11 placed in the upper part of the device. That chamber is provided with a grating 12 at its upper part, to ensure an even distribution of the flow towards the output tubing 14. It bears a boss 13 which makes it possible to place a probe for checking the quality of the light liquid (percentage of purification, for example 99%) and makes it possible, by controlling a downstream valve, not shown, placed on the light liquid outlet tubing 14, to maintain the level of the purified light liquid at the chosen point.

On considering, now, the operation of the lower part of the device, that is, the separation and the salvaging of the heavy liquid, the liquid is taken up again from the cylindrical chamber 4.

The greater part of the heavy liquid moves downwards in the direction of the arrows F4 in the inclined annular chambers 15 formed by the concentric walls 16 of the conical part 17 of the device which constitutes another main separation part, drawing away a certain quantity of droplets of light liquid.

These latter gather together on the upper wall of the annular chambers 15 to become enlarged by coalescence on coming into contact with that wall and to form a continuous layer of light liquid which then moves upwards along that wall to return into the cylindrical part 4, where it will be treated in the top of the device.

The heavy liquid, with still a few drops of liquid, moves downwards to emerge from the lower part of the chambers 15 to enter the cylindro-conical part 16, which constitutes a final separation chamber through a grating 19 for checking and distributing the discharge.

The droplets of light liquid have a tendency to move upwards and, by a secondary flow set up by the central swirling movement, are drawn away in the direction of the arrows F5 with a small quantity of heavy liquid towards the cylindrical part 4, where that mixture is recycled.

The purified heavy liquid moves downwards in a storage chamber 20 placed in the lower part of the device. That storage chamber 20 placed in the lower part of the device, is provided with a grating 21 at its lower part to ensure an even distribution of the flow towards the outlet tubing 23.

It bears a boss 22 which makes it possible to place a probe for checking the quality of the heavy liquid (percentage of purification, for example 99%) and makes it possible, by controlling a downstream valve, not shown, placed on the heavy liquid outlet tubing 23, to maintain the level of the purified heavy liquid at the chosen point.

The heavy liquid and light liquid removal pumps on the tubing 23 and 14 will be adjusted in a general way for a discharge, according to the proportion of the mixture of the two liquids at the input of the device, namely, in the present example, respectively of 60% and 40%.

In the case of an example of the treatment of a non-miscible mixture in which the proportions of the liquids are reversed, for example 60% of a light liquid (continuous liquid state) and 40% another heavier liquid (in the form of droplets), the greater part of the light liquid moves upwards in the annular chambers 6, drawing away a certain quantity of heavy droplets. The greater part of that mixture which moves upwards in the chamber 6 being constituted by a light liquid, no transformation of the heavy drops into continuous state and vice versa then occurs.

On the other hand, on considering the operation of the lower part of the device, it will be observed that in the present example, the greater part of the heavy droplets move downwards in the inclined annular chambers 15, drawing away a certain quantity of light liquid.

Due to the fact that in these annular chambers, the greater part of the mixture inserted is formed by droplets of heavy liquid, a transformation of the droplets of heavy liquid into a continuous liquid state with transformation into droplets of the light liquid drawn away occurs.

Figure 2:
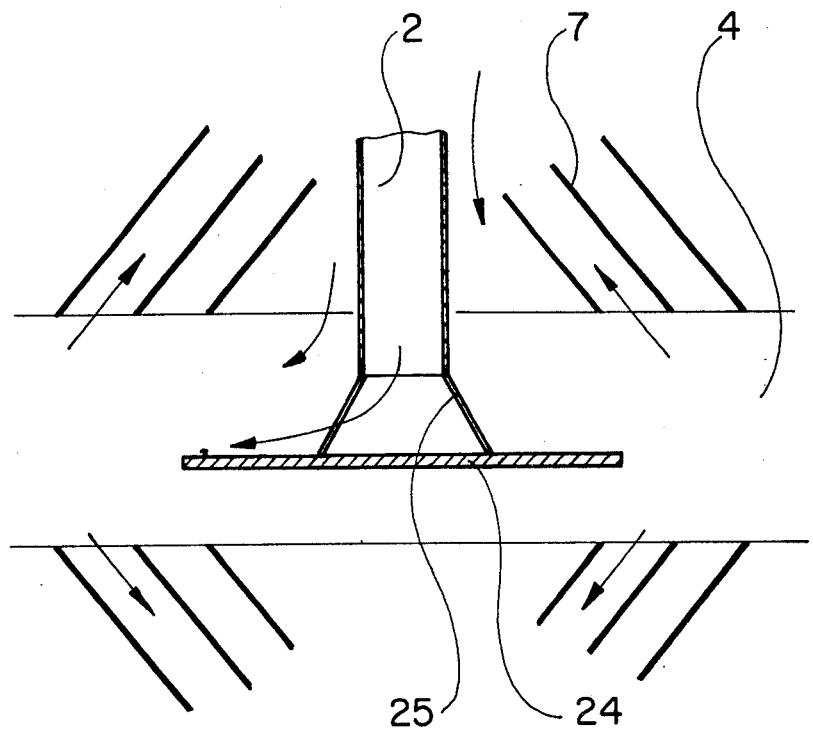
FIG. 2 is a detailed view of a variant of the invention.

FIG. 2 shows a variant of the invention in which the element for deflecting the flow coming through the pipe 2 into the cylindrical part 4 of the device is constituted by a horizontal plate 24 supported by thin ribs 25.

I claim:

1. Device for the separation of two non-miscible liquids, characterized in that it comprises, from top to bottom an upper storage chamber (11), a cylindrico-conical part (9) diverging downwards, a second conical part (8) diverging downwards, separated from the first by a grating (10) and comprising, inside it, several concentric cones (7) parallel to its wall, a third central cylindrical part (4), a fourth conical part (17) converging downwards, comprising, inside it, several concentric cones (16) parallel to its wall, a fifth conico-cylindrical part (18) converging downwards, separated from the fourth by a grating (19) and lastly, a lower storage chamber (20), a mixed liquid supply pipe (2) placed in the axis of the third part (4) and opening out vertically downwards into a deflector element (3), an output (14) for the light liquid in the top of the upper storage chamber (1) and an output (23) for the heavy liquid in the bottom of the lower storage chamber (20).

2. Device according to claim 1, characterized in that the deflector element is constituted by a horizontal plate (24) fixed in the central zone of the third part (4), the liquid supply pipe (2) opening out vertically downwards in the axis of the third part (4) and at a certain distance above the said plate.

3. Device according to claim 1, characterized in that the deflector element (3) may comprise a free central space and a peripheral portion provided with fins (5) imparting to the flow a centrifugal swirling movement.

4. Device according to claim 3, characterized in that the said element (3) is mounted so as to rotate.

5. Device according to claim 1, characterized in that the outlets (14) and (23) for light and heavy liquids are fitted with flow regulator valves.

6. Device according to claim 1, characterized in that the storage chambers (11) and (20) are fitted respectively with bosses (13), (22) comprising a probe for checking the quality of the purified liquid, controlling respectively the discharge regulator valves of the outlets (14) and (23).

* * * * *